United States Patent
Nagata

(10) Patent No.: US 11,207,996 B2
(45) Date of Patent: Dec. 28, 2021

(54) POSITION DETECTION SYSTEM AND POSITION DETECTION METHOD

(71) Applicant: Toyota Jidosha Kabushiki Kaisha, Toyota (JP)

(72) Inventor: Hideo Nagata, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 200 days.

(21) Appl. No.: 16/704,521

(22) Filed: Dec. 5, 2019

(65) Prior Publication Data

US 2020/0180459 A1 Jun. 11, 2020

(30) Foreign Application Priority Data

Dec. 7, 2018 (JP) .............................. JP2018-229783

(51) Int. Cl.
| | |
|---|---|
| B60L 53/36 | (2019.01) |
| H02J 50/10 | (2016.01) |
| B60L 53/38 | (2019.01) |
| H02J 50/90 | (2016.01) |

(52) U.S. Cl.
CPC ............... *B60L 53/36* (2019.02); *B60L 53/38* (2019.02); *H02J 50/10* (2016.02); *H02J 50/90* (2016.02)

(58) Field of Classification Search
CPC ...... B60L 53/36; B60L 53/38; B60L 2240/12; B60L 2240/80; B60L 2260/50; B60L 2240/24; B60L 53/66; B60L 2250/16; B60L 53/12; H04B 5/0081; H04B 5/0037; H02J 7/00034; H02J 7/02; H02J 2310/48; H02J 50/12; H02J 50/10; H02J 50/90; Y02T 90/16; Y02T 90/12; Y02T 90/14; Y02T 10/7072; Y02T 10/70; G01B 21/00
USPC ......................................................... 320/108
See application file for complete search history.

(56) References Cited

U.S. PATENT DOCUMENTS

| | | | |
|---|---|---|---|
| 2011/0082612 A1 | 4/2011 | Ichikawa | |
| 2016/0059723 A1* | 3/2016 | Kim | B60L 53/36 320/108 |
| 2016/0288657 A1* | 10/2016 | Tokura | B60L 53/38 |

FOREIGN PATENT DOCUMENTS

| | | |
|---|---|---|
| CN | 102209647 A | 10/2011 |
| JP | 4849190 B2 | 1/2012 |
| JP | 2015-159649 A | 9/2015 |

* cited by examiner

*Primary Examiner* — Paul Dinh
(74) *Attorney, Agent, or Firm* — Dinsmore & Shohl LLP

(57) ABSTRACT

A position detection system is applicable to a wireless power transfer system in which power is wirelessly transmitted from a power transmission unit disposed on a parking space to a power reception unit disposed on a vehicle. The position detection system includes one LF transmitting antenna in the power transmission unit, a plurality of LF receiving antennas in the power reception unit, and a vehicle ECU (control system). When the vehicle is moving, the vehicle ECU uses an LF mode to detect the position relation between the power transmission unit and the power reception unit. When the vehicle is stopped, the vehicle ECU uses an LPE mode to detect the position relation between the power transmission unit and the power reception unit.

6 Claims, 6 Drawing Sheets

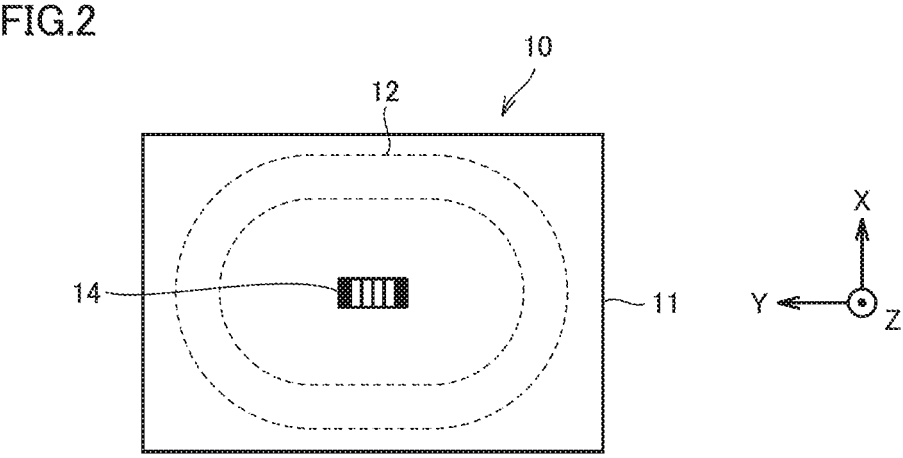
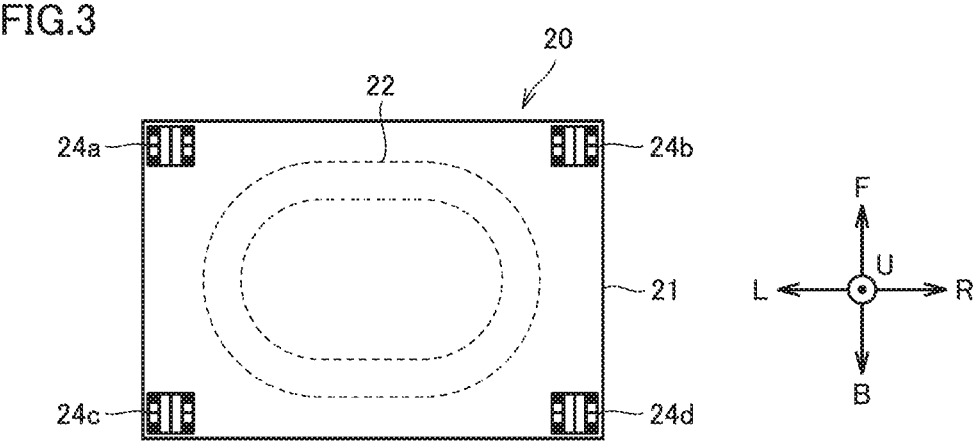

POSITION DETECTION SYSTEM AND POSITION DETECTION METHOD

CROSS REFERENCE TO RELATED APPLICATIONS

This nonprovisional application claims priority to Japanese Patent Application No. 2018-229783 filed on Dec. 7, 2018 with the Japan Patent Office, the entire contents of which are hereby incorporated by reference.

BACKGROUND

Field

The present disclosure relates to a position detection system and a position detection method applicable to a wireless power transfer system in which power is wirelessly transmitted from a power transmission unit disposed on a parking space to a power reception unit disposed on a vehicle.

Description of the Background Art

Japanese Patent No. 4849190 discloses a power transfer system in which power is wirelessly transmitted from a power transmission coil in a power transmission unit disposed on a parking space to a power reception coil in a power reception unit disposed on a vehicle. In this power transfer system, the power transmission unit includes a light emitter that emits light for position detection, and the vehicle includes an on-board camera. The vehicle is configured to photograph the light emitter of the power transmission unit using the on-board camera to detect the position relation between the power transmission unit and the power reception unit (hereinafter also simply referred to as a "unit position relation"), and based on the detected unit position relation, guide the vehicle to a target position where the vehicle can receive power from the power transmission unit.

SUMMARY

In the power transfer system described in Japanese Patent No. 4849190, the vehicle requires a camera for photographing the light emitter of the power transmission unit in order to detect the unit position relation. That is, the power transfer system described in Japanese Patent No. 4849190 is inapplicable to a vehicle with no camera. It is hoped that a technique will be developed for detecting the unit position relation without a camera.

According to the International Electrotechnical Commission (IEC), 61980 series, the modes for detecting the unit position relation without a camera include: an "LF mode", which uses a low frequency signal (hereinafter also referred to as an "LF signal") wirelessly communicated between antennas; and an "LPE mode", which uses low power (hereinafter also referred to as "low power excitation (LPE) power") outputted from a power transmission coil.

In the LF mode, a two-dimensional (planar) or three-dimensional (stereoscopic) unit position relation are detected using the LF signal wirelessly communicated between at least one transmitting antenna disposed on either one of a parking space and a vehicle, and a plurality of receiving antennas disposed on the other. Accordingly, the LF mode can detect the unit position relation even when the vehicle is remote from the power transmission unit (e.g., at a distance of some meters or more). However, when the vehicle is close to the power transmission unit, the LF signal is significantly interfered with by the power transmission unit and the power reception unit, which are larger in size than the transmitting antenna. This decreases the accuracy of detection of the unit position relation.

In the LPE mode, a one-dimensional (linear) unit position relation is conventionally detected based on the transfer efficiency of the LPE power outputted from a power transmission unit (i.e., the ratio of the magnitude of power received by a power reception unit to the magnitude of LPE power outputted from the power transmission unit). Accordingly, when the power transmission unit and the power reception unit are close to each other enough for power transfer, the amount of displacement between the units can be accurately detected. However, when the power transmission unit and the power reception unit are remote from each other, the power reception unit cannot receive the LPE power outputted from the powder transmission unit, and thus the amount of displacement between the units cannot be detected.

The present disclosure has been made to solve the above-described problems. An object of the present disclosure is to provide a wireless power transfer system in which power is wirelessly transmitted from a power transmission unit disposed on a parking space to a power reception unit disposed on a vehicle, where the position relation between the power transmission unit and the power reception unit can be accurately detected without using a camera when the vehicle is both remote from and close to the power transmission unit.

(1) A position detection system according to the present disclosure is applicable to a wireless power transfer system in which power is wirelessly transmitted from a power transmission unit disposed on a parking space to a power reception unit disposed on a vehicle, so that a position relation between the power reception unit and the power transmission unit is detected. The position detection system includes: at least one transmitting antenna disposed on one of the parking space and the vehicle; a plurality of receiving antennas disposed on the other of the parking space and the vehicle; and a control system that executes a first detection process when the vehicle is moving, and executes a second detection process when the vehicle is stopped. In the first detection process, the control system causes the transmitting antenna to output a signal, and detects the position relation based on a difference in strength of the signal which the plurality of receiving antennas receive from the transmitting antenna. In the second detection process, the control system causes the power transmission unit to output power, and detects the position relation based on the power which the power reception unit or the plurality of receiving antennas receive from the power transmission unit.

According to the above-described position detection system, when the vehicle is moving, a "first detection process" is executed in which the LF mode, which allows long-distance detection, is used to detect the position relation, since the user is presumably in the middle of moving the vehicle toward the power transmission unit and that the vehicle is still remote from the power transmission unit. On the other hand, when the vehicle is stopped, a "second detection process" is executed in which the LPE mode, which is more accurate in detection for a short distance than the LF mode, is used to detect the position relation, since the user has presumably stopped the vehicle close enough to the power transmission unit. As a result, the position relation can be accurately detected without using a camera when the vehicle is both remote from and close to the power transmission unit.

(2) In one embodiment, when the vehicle is moving, the control system executes a process for assisting parking of the vehicle based on the position relation detected by the first detection process. The transmitting antenna is disposed on the parking space. The plurality of receiving antennas are disposed on the vehicle.

In the above-described embodiment, the plurality of receiving antennas are disposed on the vehicle. Accordingly, within the vehicle, the position relation is detected by the first detection process and a process for assisting parking of the vehicle is executed based on the detection result. This can avoid the delay in the parking assistance process that would be caused by communication. If the plurality of receiving antennas were disposed on the parking space side, communication would be required for sending the reception results of the plurality of receiving antennas from the parking space to the vehicle. By contrast, the above-described embodiment does not require such communication, and thus can avoid the delay in the parking assistance process that would be caused by die communication.

(3) In one embodiment, in the second detection process, the control system detects the position relation based on the difference in the power which the plurality of receiving antennas receive from the power transmission unit.

In the above-described embodiment, the second detection process (LPE mode) can detect the unit position relation two-dimensionally or three-dimensionally. A conventional LPE mode, which uses only one power reception coil to receive the output power from the power transmission coil, can only one-dimensionally detect the unit position relation. By contrast, the above-described embodiment detects the unit position relation based on the difference in the output power which a plurality of receiving antennas receive from the power transmission coil. Accordingly, the unit position relation can be detected two-dimensionally or three-dimensionally.

(4) In one embodiment, when the vehicle is stopped, the control system executes an alignment check to determine whether or not power transmission from the power transmission unit to the power reception unit is permitted, based on the position relation detected by the second detection process. When the vehicle resumes moving after the control system determines by the alignment check that power transmission is not permitted, the control system determines whether or not an amount of displacement between the power reception unit and the power transmission unit is smaller than a reference value, the amount of displacement being determined by the position relation detected by the second detection process. When the amount of displacement is smaller than the reference value, the control system executes the second detection process. When the amount of displacement is larger than the reference value, the control system executes the first detection process.

In the above-described embodiment, when the vehicle resumes moving after the alignment check determines that power transmission is not permitted, an appropriate option is chosen between the first detection process and the second detection process, depending on the amount of displacement between the power reception unit and the power transmission unit. Therefore, even after the alignment check determines that power transmission is not permitted, the unit position relation can be accurately detected.

(5) In one embodiment, when the vehicle is moving, the control system predicts the position relation to be obtained after a lapse of prescribed time based on a vehicle speed, a steering angle, and the position relation detected by the first detection process, and executes the process for assisting parking of the vehicle based on the predicted position relation.

According to the above-described embodiment, the position relation in the future (after a lapse of prescribed time) can be predicted for proper execution of the parking assistance.

(6) A position detection method according to the present disclosure is applicable to a wireless power transfer system in which power is wirelessly transmitted from a power transmission unit disposed on a parking space to a power reception unit disposed on a vehicle, so that a position relation between the power reception unit and the power transmission unit is detected. The wireless power transfer system includes at least one transmitting antenna disposed on one of the parking space and the vehicle, and a plurality of receiving antennas disposed on the other of the parking space and the vehicle. The position detection method includes: executing a first detection process when the vehicle is moving: and executing a second detection process when the vehicle is stopped. The first detection process includes causing the transmitting antenna to output a signal, and detecting the position relation based on a difference in strength of the signal which the plurality of receiving antennas receive from the transmitting antenna. The second detection process includes causing the power transmission unit to output power, and detecting the position relation based on the power which the power reception unit or the plurality of receiving antennas receive from the power transmission unit.

According to the above-described position detection method, when the vehicle is moving, a "first detection process" is executed in which the LF mode, which allows long-distance detection, is used to detect the position relation, since the user is presumably in the middle of moving the vehicle toward the power transmission unit and that the vehicle is still remote from the power transmission unit. On the other hand, when the vehicle is stopped, a "second detection process" is executed in which the LPE mode, which is accurate in detection for a short distance, is used to detect the position relation, since the user has presumably stopped the vehicle close enough to the powder transmission unit. As a result, the position relation can be accurately detected without using a camera when the vehicle is both remote from and close to the power transmission unit.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 2 is a diagram schematically showing an example placement of a power transmission coil and an LF transmitting antenna in a power transmission unit.

FIG. 3 is a diagram schematically showing an example placement of a power reception coil and a plurality of LF receiving antennas in a power reception unit.

DETAILED DESCRIPTION

Figure 1:
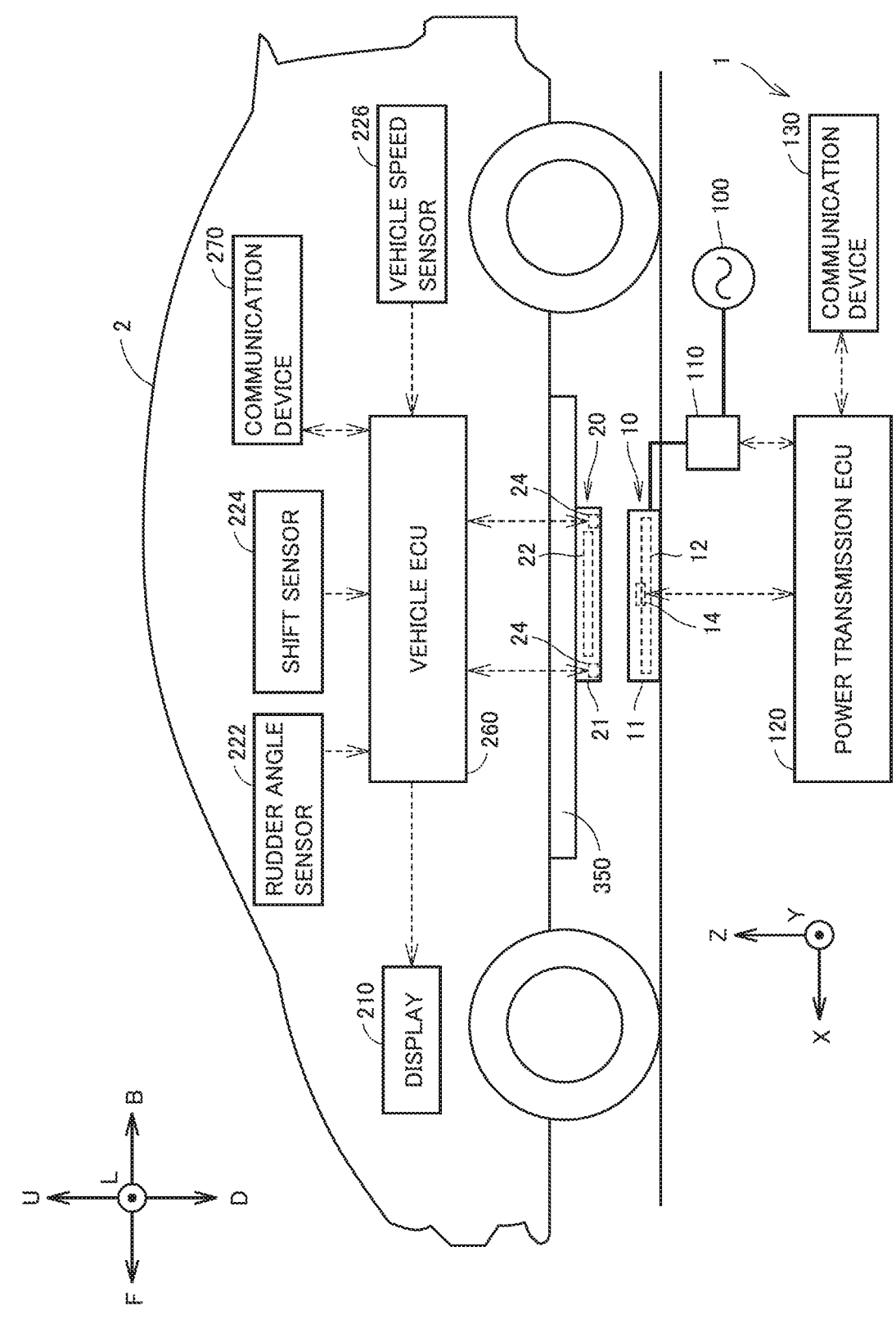
FIG. 1 is an external view of a power transfer system to which a position detection system is applicable.

An embodiment of the present disclosure will now be described in detail with reference to the drawings. In the drawings, identical reference characters represent identical or corresponding elements, and the description thereof will not be repeated.

In the following description, arrows F, B, R, L, U, and D in the drawings represent directions relative to a vehicle. Specifically, arrow F represents the forward direction, arrow B represents the backward direction, arrow R represents the right direction, arrow L represents the left direction, arrow U represents the upward direction, and arrow D represents the downward direction.

In the following description, arrows X, Y, and Z in the drawings represent the axis directions on the positional coordinates relative to a power transmission device installed on the ground surface of a vehicle parking space. Specifically, arrow X represents the X-axis direction along the longitudinal direction of the parking space (i.e., the direction in which a vehicle will enter), arrow Z represents the Z-axis direction along the height direction, and arrow Y represents the Y-axis direction perpendicular to the X-axis and the Z-axis. The origin of the positional coordinates can be set at any position.

In the following description, an electronic control unit is abbreviated as "ECU". The specific numerical values described hereinafter are merely examples and may be modified as appropriate.

<Configuration of Power Transfer System>

FIG. 1 is an external view of a power transfer system to which a position detection system according to the present embodiment is applicable. The power transfer system includes power transmission equipment 1 having a power transmission unit 10, and a vehicle 2 having a power reception unit 20.

Power transmission equipment 1 includes a power converter 110, a power transmission ECU 120, and a communication device 130, in addition to power transmission unit 10. Power transmission unit 10 is enclosed in an enclosure 11. Enclosure 11 of power transmission unit 10 also contains therein a power transmission coil 12 and a low frequency (LF) transmitting antenna 14.

Vehicle 2 includes a display 210, a rudder angle sensor 222, a shift sensor 224, a vehicle speed sensor 226, a vehicle ECU 260, and a communication device 270, in addition to power reception unit 20. Power reception unit 20 is enclosed in an enclosure 21. Enclosure 21 of power reception unit 20 also contains therein a power reception coil 22 and a plurality of LF receiving antennas 24.

FIG. 2 is a diagram schematically showing an example placement of power transmission coil 12 and LF transmitting antenna 14 in enclosure 11 of power transmission unit 10. FIG. 2 shows power transmission unit 10 seen from above (Z-axis direction). As shown in FIG. 2, power transmission coil 12 is a ring-shaped circular coil. In the present embodiment, LF transmitting antenna 14 is disposed at or near the center inside power transmission coil 12.

FIG. 3 is a diagram schematically showing an example placement of power reception coil 22 and a plurality of LF receiving antennas 24 in enclosure 21 of power reception unit 20. FIG. 3 shows power reception unit 20 seen from above (U direction). As shown in FIG. 3, power reception coil 22 is a ring-shaped circular coil. In the present embodiment, power reception unit 20 has a rectangular lower surface, where four LF receiving antennas 24 (24*a*, 24*b*, 24*c*, 24*d*) are disposed at the four corners of the lower surface of power reception unit 20.

Figure 4:
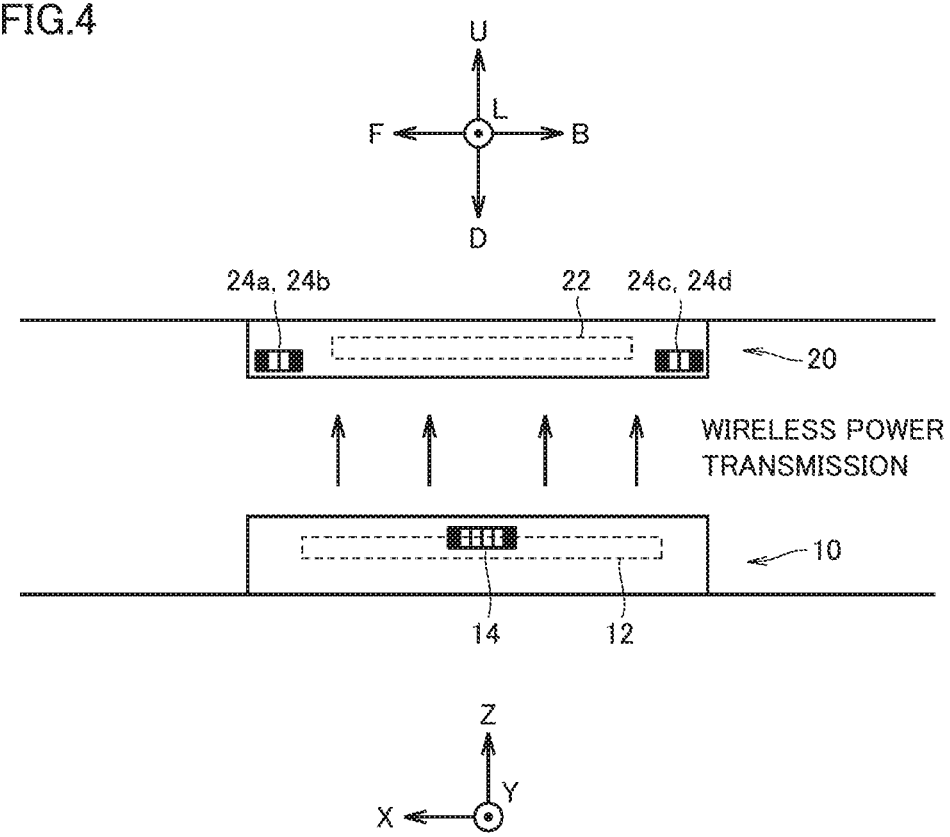
FIG. 4 is a diagram showing a state in which a vehicle is positioned so that the power reception coil in the power reception unit faces the power transmission coil in the power transmission unit.

FIG. 4 is a diagram showing a state in which vehicle 2 is positioned so that power reception coil 22 in power reception unit 20 faces power transmission coil 12 in power transmission unit 10. In this state, power can be wirelessly transmitted from power transmission coil 12 to power reception coil 22 via a magnetic field. The wireless power transmission is performed using, for example, magnetic resonance. The wireless power transmission may be performed using a method other than magnetic resonance, such as electromagnetic induction.

Referring back to FIG. 1, power transmission unit 10 is installed on a vehicle parking space. Power transmission unit 10 receives power from an AC power supply 100 (e.g., a commercial grid power supply). Power converter 110 includes, for example, a power factor correction circuit and an inverter (none of which is shown). In power converter 110, the power factor correction circuit rectifies and boosts the power from AC power supply 100, and then the inverter converts the power into AC power to output it to power transmission coil 12. Although FIG. 1 shows a case in which power converter 110 is disposed external to power transmission unit 10, the circuits constituting power converter 110 may be disposed inside of power transmission unit 10 in part or in whole.

Power transmission coil 12 constitutes a resonant circuit that resonates at a transfer frequency (i.e., the frequency of transferred power). In some embodiments, the Q factor of the resonant circuit, which represents its resonance strength, is 100 or more. When AC power is supplied from power converter 110 to power transmission coil 12, energy (power) transfers from power transmission coil 12 to power reception coil 22 via a magnetic field formed between power transmission coil 12 and power reception coil 22 of vehicle 2. The energy (power) that has transferred to power reception coil 22 is supplied to a power storage 350. Thus, power storage 350 is charged with the power from power transmission unit 10, which is called "external charging".

LP transmitting antenna 14 is configured to output a radio signal having a relatively low frequency f1 (e.g., about a hundred and some tens of kilohertz) (hereinafter also referred to as an "LF signal"), in response to an instruction from power transmission ECU 120. LF transmitting antenna 14 includes a single-axis solenoid coil to output the LF signal in the direction in which a vehicle will enter (X-axis direction). The LF signal can be used as a signal for detecting the position relation between power transmission coil 12 in power transmission unit 10 and power reception coil 22 in power reception unit 20 of vehicle 2 (hereinafter also simply referred to as a "unit position relation" or "coil position relation").

Power converter 110 is configured to adjust the magnitude and frequency of power to be outputted from power transmission coil 12, in response to a control signal from power transmission ECU 120. For example, power converter 110 can cause power transmission coil 12 to output high power for charging power storage 350, in response to a power transmission instruction from power transmission ECU 120. Power converter 110 can also cause power transmission coil 12 to output low AC power having a relatively low frequency f2 (e.g., about some tens of kilohertz) (hereinafter also referred to as "LPE power"), in response to a low power excitation (LPE) instruction from power transmission ECU 120. The LPE power can be used as a signal for detecting the unit position relation (coil position relation).

Power transmission ECU 120 includes, for example, a central processing unit (CPU), a memory, and an input-output port for inputting and outputting various signals (none of which is shown). Power transmission ECU 120 controls various devices in power transmission equipment 1. The various types of control may be performed not only by software processing, but also by dedicated hardware (electronic circuit).

Communication device 130 is configured to wirelessly communicate with communication device 270 of vehicle 2 and exchange various pieces of information with vehicle 2.

Vehicle 2 can move using the power supplied from power transmission unit 10 and stored in power storage 350. Power storage 350 is a rechargeable DC power supply and includes a secondary battery, such as a lithium-ion battery or a nickel-metal hydride battery. Vehicle 2 may be an electric vehicle that can move using only the power stored in power storage 350, or may be a hybrid vehicle that can move using a combination of the power stored in power storage 350 and the output from an engine (not shown).

Power reception unit 20 is disposed on the bottom surface of vehicle 2, for example, on the lower surface (facing the road) of power storage 350 installed on the bottom surface of vehicle 2.

Power reception coil 22 is configured to wirelessly receive power from power transmission coil 12 via a magnetic field while vehicle 2 is positioned so that power reception coil 22 faces power transmission coil 12.

A plurality of LF receiving antennas 24 (24a to 24d) are each configured to receive a signal having a relatively low frequency. In the present embodiment, each LF receiving antenna 24 includes a switching circuit that switches, in response to an instruction from vehicle ECU 260, the receivable frequency (hereinafter also referred to as "matching frequency") between frequency f1 of the LF signal from LF transmitting antenna 14 and frequency f2 of the LPE power from power transmission coil 12. That is, each LF receiving antenna 24 can receive not only the LF signal having frequency f1, but also the LPE power having frequency f2.

As shown in FIG. 3 described above, a plurality of LF receiving antennas 24 (24a to 24d) are disposed at different positions, and thus may have different distances from LF transmitting antenna 14 or power transmission coil 12. Accordingly, the strengths of LF signal or LPE power received by LF receiving antennas 24 may differ depending on the distance from LF transmitting antenna 14 or power transmission coil 12. By analyzing the difference in strength, the unit position relation can be three-dimensionally detected.

Although the above-described FIG. 3 shows a case in which four LF receiving antennas 24a to 24d are disposed at the four corners of the lower surface of power reception unit 20, the number and layout of LF receiving antennas 24 are not limited to those in FIG. 3. Specifically, the number of LF receiving antennas 24 is not limited to four, but may be any number more than or equal to two. If the number of LF receiving antennas 24 is two, the unit position relation can be two-dimensionally detected. If the number of LF receiving antennas 24 is three or more, the unit position relation can be three-dimensionally detected. The positions of LF receiving antennas 24 may be different from those in FIG. 3 described above. For example, LF receiving antennas 24 may be disposed inside power reception coil 22 in power reception unit 20, or may be disposed external to power reception unit 20.

Although the above-described FIG. 2 shows a case in which one LF transmitting antenna 14 is disposed at or near the center inside power transmission coil 12 in power transmission unit 10, the number and layout of LF transmitting antennas 14 are not limited those in FIG. 2. Specifically, the number of LF transmitting antennas 14 is not limited to one, but may be two or more. The position of LF transmitting antenna 14 may be different from that in FIG. 2 described above. Specifically, LF transmitting antenna 14 may be disposed outside power transmission coil 12 in power transmission unit 10, or may be disposed external to power transmission unit 10 (e.g., on the road surface of a parking space). If two or more LF transmitting antennas 14 are provided at different positions on vehicle 2, not only the above-described unit position relation but also the altitude of vehicle 2 relative to power transmission unit 10 can be detected.

Display 210 displays information inputted from vehicle ECU 260. Display 210 may be a screen on a meter panel, a screen on an on-board car navigation device, or a screen on a mobile device (e.g., a smartphone, a laptop computer, and a smart watch). Display 210 may have a speaker function.

Rudder angle sensor 222 detects the steering angle of vehicle 2 based on, for example, the position of the steering wheel steered by the user. Shift sensor 224 detects the shift position of vehicle 2 based on, for example, the position of the shifter operated by the user. When the shift position is the movement (drive) position, the driving force according to the position of the accelerator pedal depressed by the user is transmitted to the driving wheel of vehicle 2, thereby allowing vehicle 2 to move. When the shift position is the park (P) position, the driving wheel of vehicle 2 is physically fixed (locked) so that it cannot rotate. Vehicle speed sensor 226 detects the moving speed (vehicle speed) of vehicle 2. These sensors send the detection results to vehicle ECU 260.

Communication device 270 is configured to wirelessly communicate with communication device 130 of power transmission equipment 1 and exchange various pieces of information with power transmission equipment 1.

Vehicle ECU 260 includes, for example, a CPU, a memory, and an input-output port (none of winch is shown). Vehicle ECU 260 controls various devices in power reception unit 20. The various types of control may be performed not only by software processing, but also by dedicated hardware (electronic circuit).

<Power Transmission from Power Transmission Device to Power Reception Device>

The way of power transmission from power transmission unit 10 to power reception unit 20 will now be described.

When vehicle 2 gets close to power transmission equipment 1 and the distance between them becomes less than a prescribed distance, wireless communication is established between communication device 270 of vehicle 2 and communication device 130 of power transmission equipment 1.

When wireless communication is established between power transmission equipment 1 and vehicle 2, vehicle ECU 260 executes a process (hereinafter also referred to as a "parking assistance process") to display an image on the screen of display 210 for assisting vehicle 2 to park at a position such that the amount of displacement between power transmission coil 12 in power transmission unit 10 and power reception coil 22 in power reception unit 20 is within a permissible range (hereinafter also referred to as a "power receivable position"). As described later, this parking assistance process is executed based on the unit position relation detected in the LF mode.

The user of vehicle 2 can align (or correct the position of) power reception unit 20 with power transmission unit 10 by driving vehicle 2 while checking the parking assistance image displayed on the screen of display 210.

When the user of vehicle 2 stops vehicle 2 by operating the shifter to the P position, vehicle ECU 260 determines that the alignment of power reception unit 20 with power transmission unit 10 has completed. Vehicle ECU 260 thus stops the parking assistance process and slops displaying the parking assistance image on the screen of display 210.

After that, vehicle ECU 260 executes a process (hereinafter also referred to as an "alignment check") to determine whether or not power transmission from power transmission unit 10 to power reception unit 20 is permitted. As described later, this alignment check is executed based on the unit position relation detected in the LPE mode.

When vehicle ECU 260 determines that power transmission is permitted as a result of the alignment check, vehicle ECU 260 sends a request for starting power transmission to power transmission unit 10. When the request for starting power transmission from vehicle 2 is received by communication device 130 of power transmission equipment 1, power transmission ECU 120 starts power transmission to power reception unit 20.

Upon the start of power transmission from power transmission unit 10, vehicle ECU 260 executes external charging in which power storage 350 is charged with the power from power transmission unit 10. When a prescribed condition for ending the charging is satisfied, vehicle ECU 260 ends the external charging.

<Method for Detecting Unit Position Relation>

For detecting the unit position relation, the power transfer system according to the present embodiment has two types of detection modes: a low frequency (LF) mode, and a low power excitation (LPE) mode.

In the LF mode, the unit position relation is two-dimensionally or three-dimensionally detected using the LF signal wirelessly communicated between one LF transmitting antenna 14 disposed on power transmission equipment 1, and a plurality of LF receiving antennas 24 disposed on vehicle 2. Accordingly, the LF mode can detect a two-dimensional or three-dimensional unit position relation even when vehicle 2 is remote from power transmission unit 10 (e.g., at a distance of some meters or more). However, when vehicle 2 is close to power transmission unit 10, the accuracy of detection of the unit position relation in the LF mode is decreased.

Figure 5:
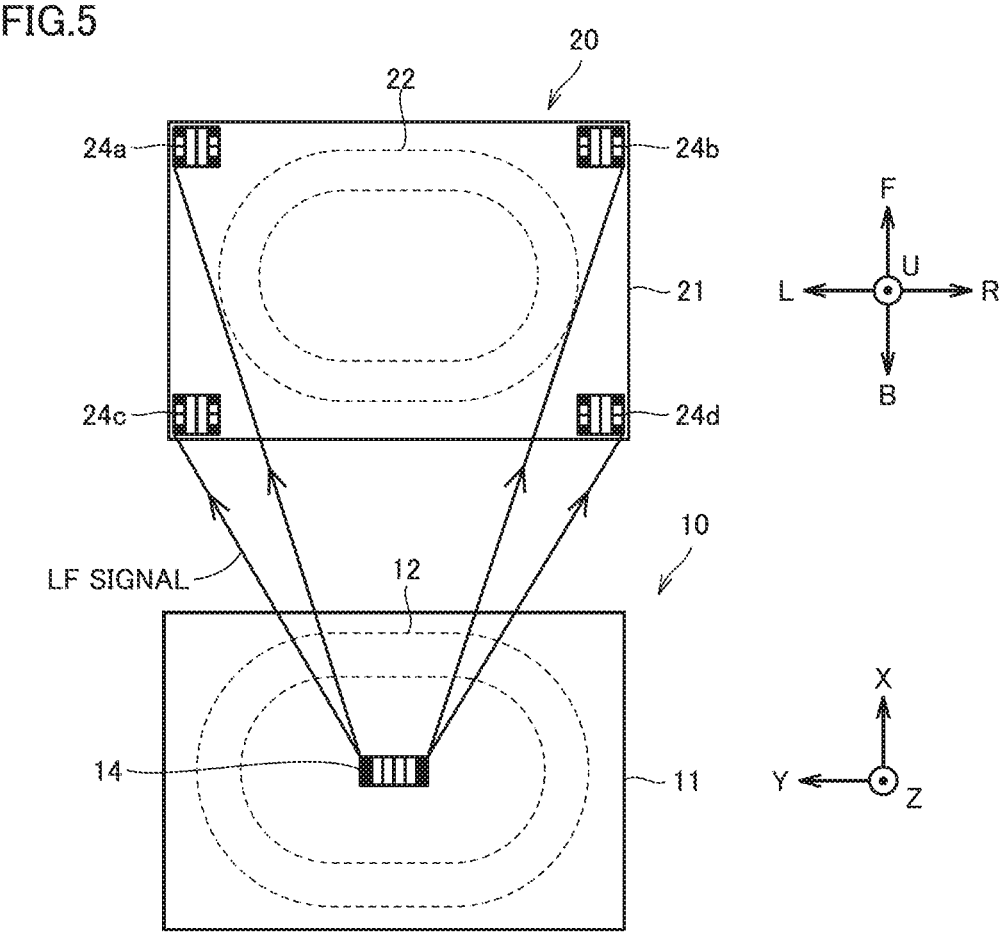
FIG. 5 is a diagram schematically showing LF signal transfer paths of when the vehicle is remote from the power transmission unit.

FIG. 5 is a diagram schematically showing LF signal transfer paths of when vehicle 2 is remote from power transmission unit 10. When vehicle 2 is remote from power transmission unit 10, the LF signal transfer paths are not easily influenced by power transmission coil 12 and power reception coil 22.

Figure 6:
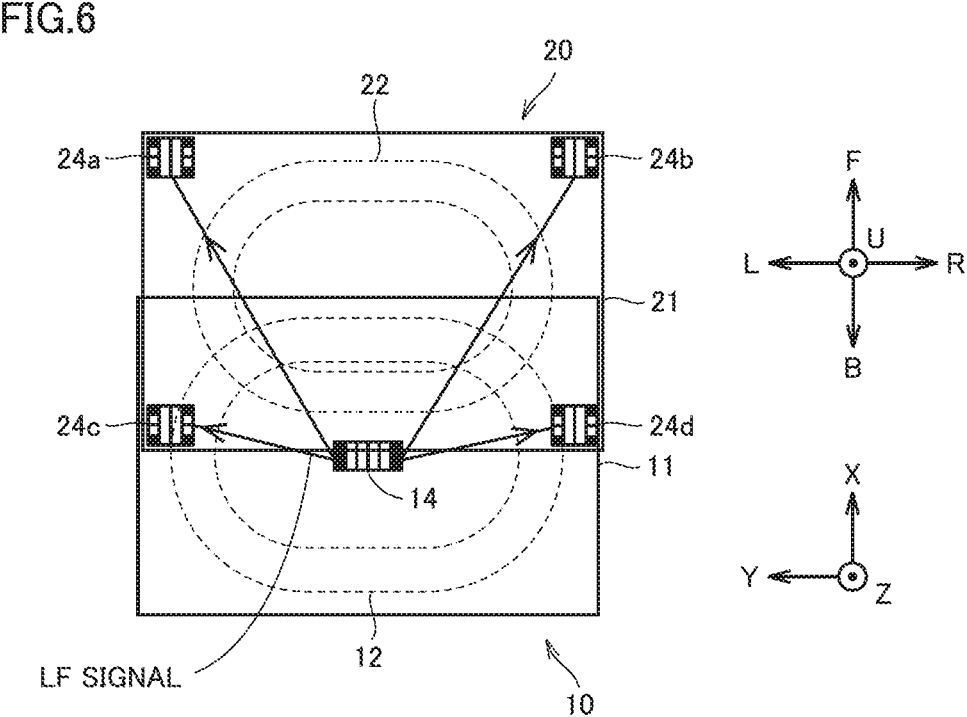
FIG. 6 is a diagram schematically showing LF signal transfer paths of when the vehicle is close to the power transmission unit.

FIG. 6 is a diagram schematically showing LF signal transfer paths of when vehicle 2 is close to power transmission unit 10. When vehicle 2 is close to power transmission unit 10, the LF signal transfer paths are easily influenced by power transmission coil 12 and power reception coil 22. Accordingly, the LF signal is significantly is interfered with by power transmission coil 12 and power reception coil 22, which are larger in size than LF transmitting antenna 14. As a result, the accuracy of detection of the unit position relation in the LF mode is decreased. Therefore, it is difficult to achieve the position detection accuracy required for the alignment check (about plus or minus some centimeters).

On the other hand, in a conventional LPE mode, a one-dimensional (linear) unit position relation is detected based on the transfer efficiency of the LPE power outputted from power transmission coil 12 (i.e., the ratio of the magnitude of power received by power reception coil 22 to the magnitude of LPE power outputted from power transmission coil 12). Accordingly, when power transmission coil 12 and power reception coil 22 are close to each other enough for power transfer, the amount of displacement between the units can be accurately detected. However, when power transmission coil 12 and power reception coil 22 are remote from each other, power reception coil 22 cannot receive the LPE power outputted from power transmission coil 12, and thus the amount of displacement between the units cannot be detected.

In order to cope with such situations, vehicle ECU 260 according to the present embodiment uses the LF mode to detect the unit position relation when vehicle 2 is moving (first detection process); and uses the LPE mode to detect the unit position relation when vehicle 2 is stopped (second detection process). In this way, the unit position relation can be accurately detected without using a camera when vehicle 2 is both remote from and close to power transmission unit 10.

Figure 7:
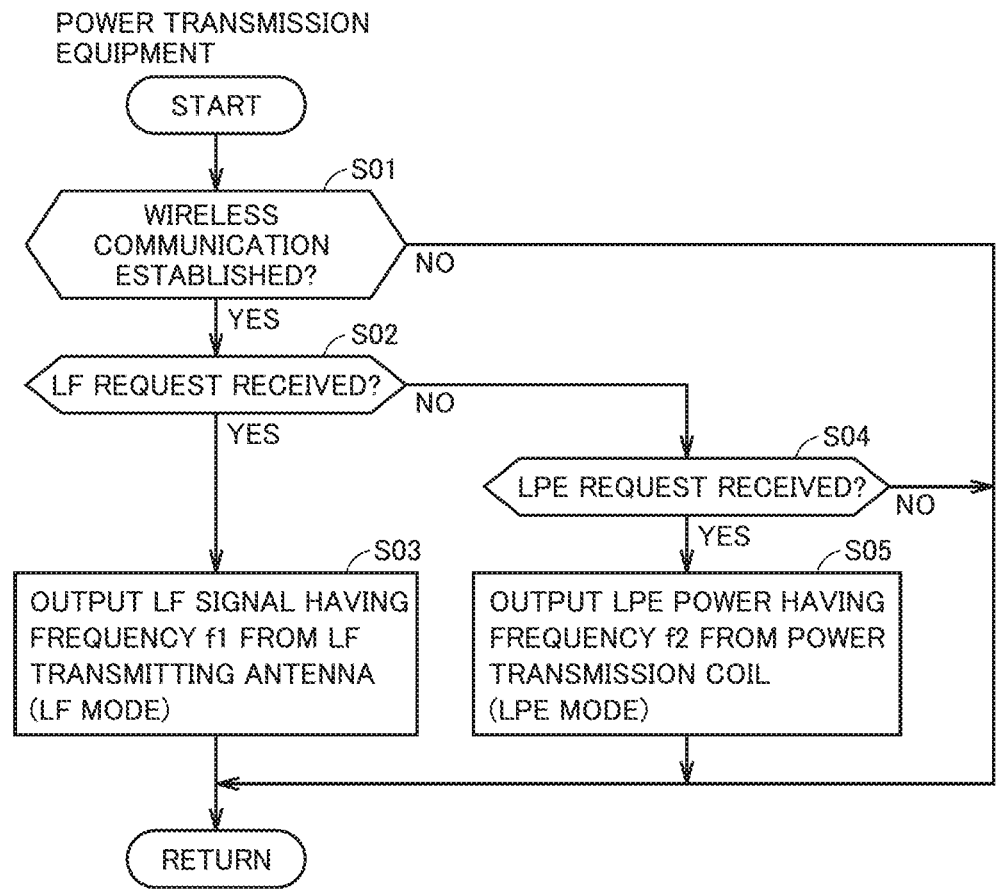
FIG. 7 is a flowchart showing an example procedure to be executed by a power transmission ECU.

FIG. 7 is a flowchart showing an example procedure to be executed by power transmission ECU 120. This flowchart is repeatedly executed every time a predetermined condition is satisfied (e.g., every prescribed period).

Power transmission ECU 120 determines whether or not wireless communication with vehicle 2 has been established (step S01). When wireless communication with vehicle 2 has not been establish (NO at step S01), power transmission ECU 120 skips the subsequent processes and advances the process to "RETURN".

When wireless communication with vehicle 2 has been established (YES at step S01), power transmission ECU 120 determines whether or not an LF request signal has been received from vehicle 2 (step S02).

When an LF request signal has been received (YES at step S02), power transmission ECU 120 causes LF transmitting antenna 14 to output an LF signal having frequency f1 (step S03).

On the other hand, when an LF request signal has not been received (NO at step S02), power transmission ECU 120 determines whether or not an LPE request signal has been received from vehicle 2 (step S04). When an LPE request signal has not been received (NO at step S04), power transmission ECU 120 skips the subsequent processes and advances the process to "RETURN".

When an LPE request signal has been received (YES at step S04), power transmission ECU 120 controls power converter 110 to output LPE power having frequency f2 from power transmission coil 12 (step S05).

Figure 8:
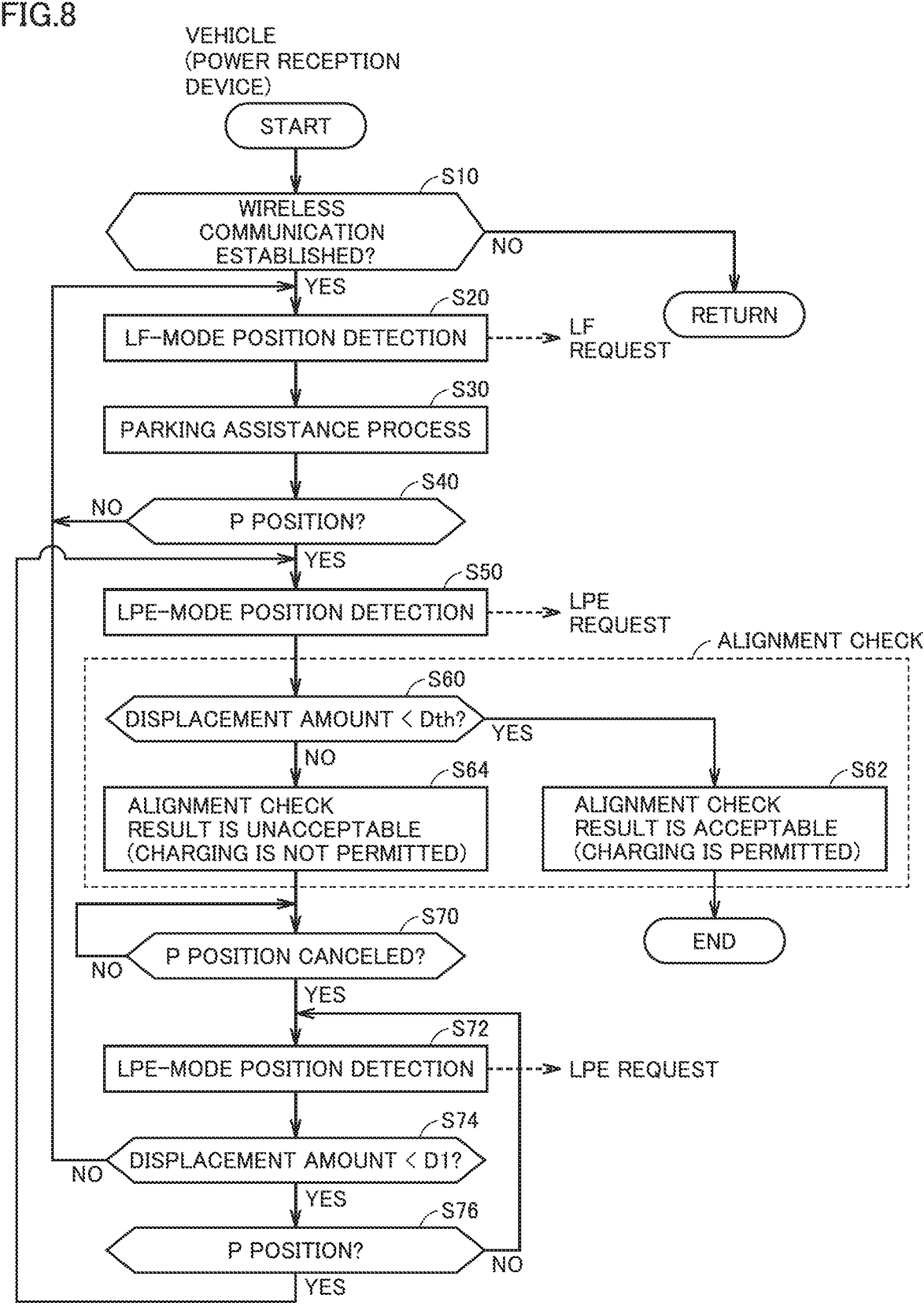
FIG. 8 is a flowchart showing an example procedure to be executed by a vehicle ECU.

FIG. 8 is a flowchart showing an example procedure to be executed by vehicle ECU 260. This flowchart starts when vehicle 2 is moving (when the shift position is the drive position).

Vehicle ECU 260 determines whether or not wireless communication with power transmission equipment 1 has been established (step S10). When wireless communication with power transmission equipment 1 has not been established (NO at step S10), vehicle ECU 260 skips the subsequent processes and advances the process to "RETURN".

When wireless communication with power transmission equipment 1 has been established (YES at step S10), vehicle ECU 260 executes a process for detecting the unit position relation in the LF mode (first detection process) (step S20). Specifically, vehicle ECU 260 outputs an LF request signal to power transmission equipment 1 and switches the matching frequency of a plurality of LF receiving antennas 24 to frequency f1 of the LF signal. This allows LF transmitting antenna 14 of power transmission unit 10 to output an LF signal, and the LF signal is received by a plurality of LF receiving antennas 24. Power transmission ECU 120 detects the unit position relation based on the difference in strength of the LF signal received by a plurality of LF receiving antennas 24.

Then, vehicle ECU 260 performs the above-described parking assistance process based on the unit position relation detected in the LF mode (step S30). That is, vehicle ECU 260 displays a parking assistance image on the screen of display 210 for assisting vehicle 2 to park at a power receivable position, based on the unit position relation detected in the LF mode.

Then, vehicle ECU 260 determines whether or not the shift position has been switched to the P position (step S40). When the shift position has not been switched to the P position (NO at step S40), vehicle ECU 260 returns the process to step S20, and repeats the processes of steps S20, S30, and S40 until the shift position is switched to the P position.

When the shift position has been switched to the P position (YES at step S40), vehicle ECU 260 executes a process for detecting the unit position relation in the LPE mode (second detection process) (step S50). Specifically, vehicle ECU 260 outputs an LPE request signal to power transmission unit 10, and switches the matching frequency of a plurality of LF receiving antennas 24 to frequency f2 of the LPE power. This allows power transmission coil 12 in power transmission unit 10 to output LPE power, and the LPE power is received by a plurality of LF receiving antennas 24. Power transmission ECU 120 detects the unit position relation based on the difference in strength (magnitude) of the LPE power received by a plurality of LF receiving antennas 24.

Then, vehicle ECU 260 performs the above-described alignment check based on the unit position relation detected in the LPE mode (steps S60, S62, and S64). Specifically, first, vehicle ECU 260 determines whether or not the amount of displacement between power transmission coil 12 and power reception coil 22 estimated from the unit position relation detected in the LPE mode is smaller than a threshold value Dth (e.g., about some centimeters) (step S60). When the amount of displacement is smaller than threshold value Dth (YES at step S60), vehicle ECU 260 determines that the result of the alignment check is acceptable (charging is permitted) (step S62). On the other hand, when the amount of displacement is larger than threshold value Dth (NO at step S60), vehicle ECU 260 determines that the result of the alignment check is unacceptable (charging is not permitted) (step S64). Vehicle ECU 260 displays the result of the alignment check (acceptable or unacceptable) on display 210.

When the result of the alignment check is unacceptable (charging is not permitted), it is expected that the user will move vehicle 2 for alignment. Accordingly, vehicle ECU 260 determines whether or not the P position has been canceled (step S70). When the P position is maintained without being canceled (NO at step S70), vehicle ECU 260 returns the process to step S70 and waits until the P position is canceled.

When the P position has been canceled (YES at step S70), vehicle ECU 260 executes a process for detecting the unit position relation in the LPE mode again (second detection process) (step S72). The content of the process of step S72 is the same as the content of the process of step S50 described above.

Then, vehicle ECU 260 determines whether or not the amount of displacement estimated from the unit position relation detected in the LPE mode is smaller than a prescribed value D1 (step S74). Prescribed value D1 depends on the accuracy of detection of the unit position relation determined in the LPE mode, and is larger than threshold value Dth (e.g., about some lens of centimeters).

When the amount of displacement is smaller than prescribed value D1 (YES at step S74), vehicle ECU 260 determines that the user has not moved vehicle 2 so greatly and that the accuracy of detection of the unit position relation determined in the LPE mode satisfies the position detection accuracy required for the alignment check. Therefore, vehicle ECU 260 maintains the LPE mode for detecting the unit position relation. Specifically, vehicle ECU 260 determines again whether or not the shift position has been switched to the P position (step S76). When the shift position has not been switched to the P position (NO at step S76), vehicle ECU 260 returns the process to step S72. On the other hand, when the shift position has been switched to the P position (YES at step S76), vehicle ECU 260 returns the process to step S50 to detect the unit position relation in the LPE mode and perform the alignment check again using the detection result.

On the other hand, when the amount of displacement is larger than prescribed value D1 (NO at step S74), vehicle ECU 260 determines that the user has greatly moved vehicle 2 and that the accuracy of detection of the unit position relation determined in the LPE mode has become lower than the position detection accuracy required for the alignment check. Therefore, vehicle ECU 260 stops using the LPE mode and instead uses the LF mode to detect the unit position relation. Specifically, vehicle ECU 260 returns the process to step S20 and starts from the parking assistance process again.

As such, in the power transfer system according to the present embodiment, when vehicle 2 is moving, the LF mode, which allows long-distance detection, is used to detect the unit position relation (first detection process), since the user is presumably in the middle of moving vehicle 2 toward power transmission unit 10 and that vehicle 2 is still remote from power transmission unit 10. On the other hand, when vehicle 2 is stopped, the LPE mode, which is more accurate in detection for a short distance than the LF mode, is used to detect the unit position relation (second detection process), since the user has presumably stopped vehicle 2 close enough to power transmission unit 10. As a result, the unit position relation can be accurately detected without using a camera when vehicle 2 is both remote from and close to power transmission unit 10.

In particular, in the power transfer system according to the present embodiment, a plurality of LF receiving antennas 24 are disposed on vehicle 2. Accordingly, within vehicle 2, the unit position relation is detected in the LF mode and the parking assistance process is executed based on the detection result. This can avoid the delay in the parking assistance process that would be caused by communication. If a plurality of LF receiving antennas 24 were disposed on the power transmission equipment 1 side (parking space side), communication would be required for sending the reception results of a plurality of LF receiving antennas 24 from the power transmission equipment 1 side to the vehicle 2 side. By contrast, the present embodiment does not require such communication, and thus can avoid the delay in the parking assistance process that would be caused by the communication.

Further, in the LPE-mode detection (second detection process) according to the present embodiment, the unit position relation is detected based on the difference in magnitude of the power which a plurality of LF receiving antennas 24 receive from power transmission coil 12 in power transmission unit 10. Therefore, the LPE-mode detection (second detection process) can detect the unit position relation two-dimensionally or three-dimensionally. A conventional LPE mode, which uses only one power reception coil 22 to receive the output power from power transmission coil 12, can only one-dimensionally detect the unit position relation. By contrast, the present embodiment uses a plurality of LF receiving antennas 24, instead of one power reception coil 22, to receive the output power from power transmission coil 12. The present embodiment detects the unit position relation based on the difference in magnitude of the power received by a plurality of LF receiving antennas 24. Accordingly, the present embodiment can detect the unit position relation two-dimensionally or three-dimensionally.

Further, in the present embodiment. LF receiving antennas 24 on the vehicle 2 side can be used for both the LPE-mode detection (second detection process) and the LF-mode detection (first detection process) in common. If a plurality of LF receiving antennas 24 for the LF-mode detection were disposed on the power transmission equipment 1 side, a plurality of LPE power reception coils would be additionally required on the vehicle 2 side for detecting the unit position relation two-dimensionally or three-dimensionally in the LPE mode. In the present embodiment, however, a plurality of LF receiving antennas 24 are disposed on the vehicle 2 side and serve also as LPE power reception coils. This can avoid the waste of additionally providing a plurality of LPE power reception coils on the vehicle 2 side.

Further, in the present embodiment, when the P position is canceled after the alignment check determines that power transmission is not permitted, vehicle 2 is expected to resume moving. Accordingly, an appropriate option is chosen between the LPE-mode detection and the LF-mode detection, depending on the amount of displacement determined by the coil position relation detected by the LPE mode. Therefore, even after the alignment check determines that power transmission is not permitted, the unit position relation can be accurately detected.

<Variation 1>

In the above-described embodiment, when vehicle 2 is moving, the parking assistance process is executed based on the current unit position relation detected in the LF mode.

As a variation, when vehicle 2 is moving, the unit position relation in the future (after a lapse of prescribed time) may be predicted based on the vehicle speed detected by vehicle speed sensor 226, the steering angle detected by rudder angle sensor 222, and the current unit position relation detected in the LF mode; and the predicted unit position relation may be used to execute the vehicle parking process. Thus, the unit position relation in the future (after a lapse of prescribed time) can be predicted for proper execution of the parking assistance.

<Variation 2>

In the above-described embodiment, the LPE-mode detection (second detection process) detects a three-dimensional unit position relation based on the difference in magnitude of the power which four LF receiving antennas 24 receive from power transmission coil 12 in power transmission unit 10.

As a variation, as in a conventional manner, the LPE-mode detection (second detection process) may detect a one-dimensional (linear) unit position relation based on the transfer efficiency of the LPE power outputted from power transmission coil 12 (i.e., the ratio of the magnitude of power received by power reception coil 22 to the magnitude of LPE power outputted from power transmission coil 12).

<Variation 3>

In the above-described embodiment, LF transmitting antenna 14 is disposed on power transmission equipment 1 (parking space), and LF receiving antennas 24 (24a to 24d) are disposed on vehicle 2.

As a variation, LF transmitting antenna 14 may be disposed on vehicle 2, and LF receiving antennas 24 (24a to 24d) may be disposed on power transmission equipment 1 (parking space).

Although embodiments of the present disclosure have been described, it should be understood that the embodiments disclosed herein are by way of example in every respect, not by way of limitation. The scope of the present disclosure is defined by the terms of the claims, and is intended to include any modification within the meaning and scope equivalent to the terms of the claims.

What is claimed is:

1. A position detection system applicable to a wireless power transfer system in which power is wirelessly transmitted from a power transmission unit disposed on a parking space to a power reception unit disposed on a vehicle, so that a position relation between the power reception unit and the power transmission unit is detected, the position detection system comprising:
   at least one transmitting antenna disposed on one of the parking space and the vehicle;
   a plurality of receiving antennas disposed on the other of the parking space and the vehicle; and
   a control system that executes a first detection process when the vehicle is moving, and executes a second detection process when the vehicle is stopped, wherein
   in the first detection process, the control system causes the transmitting antenna to output a signal, and detects the position relation based on a difference in strength of the signal which the plurality of receiving antennas receive from the transmitting antenna, and
   in the second detection process, the control system causes the power transmission unit to output power, and detects the position relation based on the power which the power reception unit receives from the power transmission unit or based on a difference in the power which the plurality of receiving antennas receive from the power transmission unit.

2. The position detection system according to claim 1, wherein
   when the vehicle is moving, the control system executes a process for assisting parking of the vehicle based on the position relation detected by the first detection process,
   the transmitting antenna is disposed on the parking space, and
   the plurality of receiving antennas are disposed on the vehicle.

3. The position detection system according to claim 1, wherein
in the second detection process, the control system detects the position relation based on the difference in the power which the plurality of receiving antennas receive from the power transmission unit.

4. The position detection system according to claim 3, wherein
when the vehicle is stopped, the control system executes an alignment check to determine whether or not power transmission from the power transmission unit to the power reception unit is permitted, based on the position relation detected by the second detection process,
when the vehicle resumes moving after the control system determines by the alignment check that power transmission is not permitted, the control system determines whether or not an amount of displacement between the power reception unit and the power transmission unit is smaller than a reference value, the amount of displacement being determined by the position relation detected by the second detection process,
when the amount of displacement is smaller than the reference value, the control system executes the second detection process, and
when the amount of displacement is larger than the reference value, the control system executes the first detection process.

5. The position detection system according to claim 2, wherein
when the vehicle is moving, the control system predicts the position relation to be obtained after a lapse of prescribed time based on a vehicle speed, a steering angle, and the position relation detected by the first detection process, and executes the process for assisting parking of the vehicle based on the predicted position relation.

6. A position detection method applicable to a wireless power transfer system in which power is wirelessly transmitted from a power transmission unit disposed on a parking space to a power reception unit disposed on a vehicle, so that a position relation between the power reception unit and the power transmission unit is detected,
the wireless power transfer system including at least one transmitting antenna disposed on one of the parking space and the vehicle, and a plurality of receiving antennas disposed on the other of the parking space and the vehicle, the position detection method comprising:
executing a first detection process when the vehicle is moving; and
executing a second detection process when the vehicle is stopped,
the first detection process including causing the transmitting antenna to output a signal, and detecting the position relation based on a difference in strength of the signal which the plurality of receiving antennas receive from the transmitting antenna,
the second detection process including causing the power transmission unit to output power, and detecting the position relation based on the power which the power reception unit or the plurality of receiving antennas receive from the power transmission unit.

* * * * *